United States Patent [19]

Taniguti et al.

[11] Patent Number: 5,076,863
[45] Date of Patent: Dec. 31, 1991

[54] JOINED BODY OF CERAMIC MEMBER AND METALLIC MEMBER, AND PROCESS FOR JOINING CERAMIC MEMBER AND METALLIC MEMBER

[75] Inventors: Masato Taniguti; Masaya Ito, both of Nagoya, Japan

[73] Assignee: NGK Spark Plug Co., Ltd., Japan

[21] Appl. No.: 614,030

[22] Filed: Nov. 16, 1990

Related U.S. Application Data

[63] Continuation of Ser. No. 416,257, Oct. 2, 1989, abandoned.

[30] Foreign Application Priority Data

Oct. 4, 1988 [JP] Japan .................. 63-250694
Dec. 8, 1988 [JP] Japan .................. 63-310848

[51] Int. Cl.⁵ .................................... C21D 1/00
[52] U.S. Cl. .............................. 148/127; 228/122
[58] Field of Search ............... 148/11.5 Q, 16, 127; 228/122, 124

[56] References Cited

U.S. PATENT DOCUMENTS

| | | | |
|---|---|---|---|
| 4,591,535 | 5/1986 | Mizuhara | 428/627 |
| 4,598,025 | 7/1986 | Mizuhara | 428/627 |
| 4,711,386 | 12/1987 | Mizuhara | 428/627 |
| 4,735,866 | 4/1988 | Moorhead | 428/627 |

OTHER PUBLICATIONS

Brazing Manual, 3rd ed., American Welding Society, 1976, pp. 30-31.

Primary Examiner—R. Dean
Assistant Examiner—George Wyszomierski
Attorney, Agent, or Firm—Finnegan, Henderson, Farabow, Garrett & Dunner

[57] ABSTRACT

A joined body of a ceramic member and a metallic member is used as tappets in internal-combustion engines, tools employing brazing etc., and is joined to each other through a layer of a brazing filler material, in which the brazing filler material has a solidus point of not higher than 700° C., the metallic member comprises a metallic material of which the pearite transformation is brought about at a temperature not higher than the solidus point of the brazing filler material or is inhibited, and the metallic structure after joining comprises at least one of a supercooled structure and a martensite structure. A joining process for producing the joined body comprises the steps of heating an assembly of the ceramic member, the metallic member and the brazing filler material arranged in the position to or above the austenitic transformation point of the metallic material, and cooling the assembly at a predetermined cooling rate by gaseous medium cooling.

4 Claims, 3 Drawing Sheets

JOINED BODY OF CERAMIC MEMBER AND METALLIC MEMBER, AND PROCESS FOR JOINING CERAMIC MEMBER AND METALLIC MEMBER

This application is a continuation of application Ser. No. 07/416,257 filed Oct. 2, 1989 now abandoned.

BACKGROUND OF THE INVENTION

1. Field of the Invention

This invention relates, in a first aspect thereof, to a joined body of a ceramic member and a metallic member and, in a second aspect thereof, to a process for joining a ceramic member and a metallic member to each other.

The joined body according to the first aspect of this invention and the joining process according to the second aspect of the invention are applicable to not only sliding component parts such as tappets, rocker arms, valve bridges etc. in internal-combustion engines but also a variety of tools employing brazing (tools comprising a super hard material, an $Si_3N_4$ material, etc.), vacuum switches, surge arresters, thyristors, vacuum-sealed terminals, IC packages electrode material, joined parts with a difference in expansion characteristic, etc.

2. Description of the Prior Art

Engineering ceramics such as silicon nitride have excellent mechanical strength, heat resistance and wear resistance, and they have recently been paid attention to as wear-resistant material for engine component parts or the like. However, ceramics are generally hard, brittle and poor workability. Therefore, composite structures comprising a metallic material and a ceramic material connected to each other are commonly used in many cases.

Connection of a metallic material and a ceramic material is generally carried out by thermal joining using a brazing filler material. Ceramics comprising $Si_3N_4$, SiC or the like, however, have coefficients of expansion or contraction equivalent to $\frac{1}{8}$ to $\frac{1}{4}$ times those of metals. It is difficult to achieve normal joining of such a ceramic and a metal, because a strain is generated in the ceramic due to the difference in contraction coefficient between the ceramic and the metal at the time of contraction in a joining process. Therefore, joining of a ceramic member and a metallic member has hitherto been conducted with stress relaxation by disposing a Cu or other soft metal plate (shock-absorbing plate) between the ceramic member and the metallic member.

In this type of conventional joining body, the shock-absorbing plate is required in addition to a brazing filler material, in order to absorb the difference in expantion or contraction between the ceramic member and the metallic member. If the diameter of the joint is too large, the use of the shock-absorbing plate is not enough to absorb the difference in contraction. This method thus involves limitation or difficulties in application to joining of a ceramic member and a metallic member with a large joint diameter. Besides, the conventional joining method requiring the shock-absorbing plate for joining is disadvantageous on an economical basis, involves troublesome setting of members, and has a possibility of the shock-absorbing plate being left unset.

On the other hand, a direct joining method without using any shock-absorbing plate may be contemplated, in which a metallic material to be joined may be the 42 nickel alloy, Kovar or the like having a relatively low coefficient of expansion. These low-expansion metals, however, generally have an inflection point at a temperature of around 250° to 450° C., at which the expansion coefficient is rapidly increased. Thus, it is difficult to apply the direct joining method and the low-expansion metals to low-expansion ceramics such as silicon nitride, silicon carbide and aluminum nitride. In the case of joining such a low-expansion metal to alumina, there is the problem of high material cost because the low-expansion metal contains expensive Co or Ni in a large amount. Accordingly, there has been a keen request for the development of a directly joined body of a ceramic member and a metallic member, having little joint strain and being inexpensive, as well as a joining method for obtaining the joined body.

SUMMARY OF THE INVENTION

Objects of the Invention

It is an object of this invention to provide a joined body of a ceramic member and a metallic member, without using any shock-absorbing plate and with little difference in displacement due to expansion or contraction between the ceramic member and the metallic member.

It is another object of this invention to provide a process for joining a ceramic member and a metallic member, without using any shock-absorbing plate and with little difference in displacement due to expansion or contraction between the ceramic member and the metallic member. To achieve the objects and in accordance with the purpose of the invention, as embodied and broadly described herein, the invention comprises a body comprising a ceramic member and a metallic member joined by a brazing filler material layer, wherein the brazing filler material layer comprises a brazing filler material having a solidus point not higher than 700° C., and the metallic member comprises a metallic material selected from a group of material consisting of (1) material in which the pearlite transformation is inhibited and (2) material in which the pearlite transformation, including the ordinary pearlite transformation ($Ar_1$) and the supercooled pearlite transformation (Ar') caused by a temperature lower than the ordinary pearlite transformation ($Ar_1$) point after supercooling of austenite, occurs at temperature not higher than the solidus point of the brazing filler material, the metallic member comprising by weight 1 to 5% of Ni, not more than 8% of Cr, 0.3 to 1.5% of Mn, not more than 1.5% of Mo, not more than 2% of C, and iron, wherein the metallic structure after joining is a supercooled structure and comprises at least one of the troostite structure, a bainite structure, a sorbite structure and a martensite structure.

Principle and Features of the Invention

The principle applied to this invention will now be described below.

First, as shown in continuous line of FIG. 3, when a carbon steel (at least 0.03% C) is heated from normal temperature to a temperature ($T_3$) not higher than the austenitic transformation ($Ac_1$) point (about 730° C.) and then cooled, the dimensional variation will be as shown in the figure. Ceramics also show a tendency similar to the above. When the carbon steel is heated to or above the $Ac_1$ point as shown in FIG. 4, however, an abrupt contraction (austentic transformation) occurs at the $Ac_1$ point, and then the carbon steel restarts expanding. When the carbon steel is cooled after heated to the temperature $T_4$, the steel again starts expanding at the pearlite transformation ($Ar_1$) point, before returning to normal temperature by tracing the curve of the dimensional variation at the time of heating. Namely, when a carbon steel is heated to or above the $Ac_1$ point and then cooled, the expansion (cooling) curve presents a hysteresis.

In consideration of the above, the following will be understood. Referring to FIG. 5, for instance, when a carbon steel is heated from a point O (normal temperature) to a point P' (T °C.) and then cooled, the steel shows a contraction of Y while cooled from T °C. to normal temperature. When the carbon steel is heated from the point O to or above the $Ac_1$ point and then cooled, on the other hand, the steel shows a contraction of X while cooled from T °C. (point Q) to normal temperature. Namely, the virtual coefficient of thermal expansion (contraction) can be reduced. Where T °C. is the temperature at which a brazing filler material starts to have strength, it is possible under some conditions to render the contraction coefficients of the ceramic member and the metallic member approximately equal, thereby obtaining an ideal joined body of ceramic and metal which is substantially free of stain.

Referring to FIG. 2, there is shown a diagram representing a specific example of variation in length of a eutectoid steel (0.85% C). In the figure, curve (a) is a hysteresis curve obtained when the steel is heated from normal temperature and then slowly cooled, which shows contraction associated with the austenitic transformation at point B and re-expansion starting at point C. When slowly cooled from point D, the steel expands at point E (pearlite transformation point $Ar_1$) to have a pearlite structure in a narrow sense, and again shows contraction from point F, before returned to normal temperature. When the heated eutectoid steel is air cooled from point D, curve (b) is obtained in which the pearlite transformation point is lower than that in curve (a), due to an increased extent of supercooling. The structure obtained in the case of curve (b) is sorbite.

In the case of curve (C), oil cooling which gives a higher cooling rate as compared to air cooling is conducted from point D. The supercooled pearlite transformation (Ar') begins to occur near 550° C., but the cooling curve does not return to the level of the heating curve; thereafter, the eutectoid steel again shows, a heavy contraction and then a considerable expansion at about 200° C. (martensitic transformation point, or Ms point). The structure obtained in this case is usually a mixed structure of troostite and martensite. On return to normal temperature, the length of the eutectoid steel is greater than the original length by an amount AH.

Curve (d) shows the case where water cooling, which gives a more higher cooling rate, is carried out from point D. The pearlite transformation is completely inhibited, and only the martensitic transformation occurs, usually resulting in a mixed structure of bainite and martensite.

Curve (e) shows the case where the martensitic transformation in curve (d) is inhibited. In this case, ordinarily, a bainite structure is obtained.

It is seen from the above description that this invention is applicable to a eutectoid steel, even with a cooling rate approximate to the cooling rate of air cooling, as shown by curve (b). When it is desired to achieve more satisfactory lowering of the $Ar_1$ point or inhibition of the pearlite transformation ($Ar_1$), it is possible to obtain a more conspicuous hysteresis by use of especial air cooling, oil cooling or water cooling with a higher cooling rate. The term "especial air cooling" means the use of an especial air medium cooling method, for instance, introduction of a cooling gas, so as to provide a cooling rate approximate to the cooling rate of oil cooling or water cooling. Thus, this invention is capable of being applied to the eutectiod steel by raising the cooling rate.

However, when water cooling is applied to brazing of a ceramic and a metal to each other, in general, the ceramic may be broken by thermal shock. The especial air cooling method, on the other hand, is complicated and troublesome to carry out. Accordingly, it is more important to select a material which shows a sufficiently great hysteresis under gaseous medium cooling such as general air cooling.

As will be described below, it has been found as a result of the present inventors' studies that the $Ar_1$ point of a carbon steel varies depending on the alloying elements contained in the steel. The finding renders the above-mentioned priciple extremely useful, because it is possible to apply the principle to this invention through selection of materials.

According to a first aspect of this invention, there is provided a joined body of a ceramic member and a metallic member, joined to each other through a layer of a brazing filler material, in which the brazing filler material has a solidus point of not higher than 700° C., the metallic member comprises a metallic material of which the pearlite transformation is brought about at a temperature of not higher than the solidus point of the brazing filler material or is inhibited, and the metallic structure after joining comprises at least one of a supercooled structure and a martensite structure.

According to a second aspect of this invention, there is provided a joining process for producing the above-mentioned joined body which comprises the steps of heating to or above the austenitic transformation point of the metallic material and then cooling at predetermined cooling rate by gaseous medium cooling.

Effect of the Invention

This invention has the following advantages.

While the joined body of a ceramic member and a metallic member according to the prior art utilizes a deformation of a shock-absorbing plate to relieve the difference in displacement due to expansion or contraction between ceramic member and the metallic member, the joined body according to the first aspect of the invention utilizes a hysteretic property of the metallic material to reduce the difference in displacement due to contraction between the ceramic member and the metallic member. Therefore, the joined body according to the invention has only an extremely slight joint strain and has a favorable joint condition irrespective of the diameter of joint. Further, since there is no need for a shock-absorbing plate, the joined body according to the invention enables a reduction in cost.

The joining process according to the second aspect of the invention makes it possible to produce the joined body having useful effects mentioned above.

The above and other objects, features and advantages of this invention will become apparent from the following detailed description of the invention and appended claims, taken in conjunction with the accompanying drawings.

BRIEF DESCRIPTION OF THE DRAWINGS

FIGS. 3 to 5 are each a graph for illustrating the principle of this invention, wherein FIG. 3 is a graph showing the case of heating to a temperature lower than the austenitic transformation point and then cooling, FIG. 4 is a graph showing the case of heating to a temperature higher than the austenitic transformation point and then cooling, and FIG. 5 is a diagram illustrating the difference in contraction, in the case of heating to a temperature lower than the austenitic transformation point and then cooling and in the case of heating to a temperature higher than the austenitic transformation point and then cooling; and FIG. 6 and FIG. 7 illustrates the method of measurement of shearing strength, used in Examples, wherein FIG. 6 is a left side view and FIG. 7 is a vertical sectional view.

DETAILED DESCRIPTION OF THE INVENTION

Figure 1:
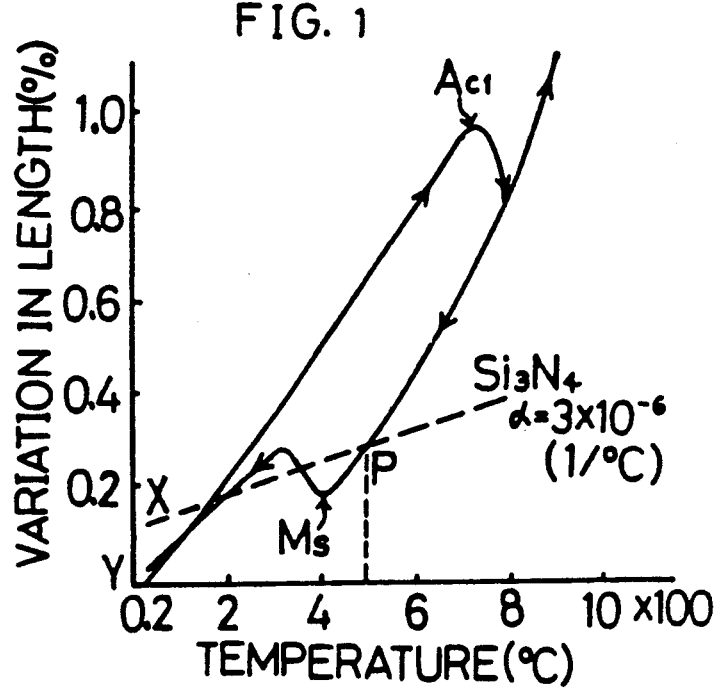
FIG. 1 is a graph showing the relationship between temperature and elongation (contraction), of a joined body according to Example 1.

The gist of this invention is to obtain a joined body of ceramic and metal with extremely little joint strain by causing the contraction coefficients of the ceramic and metal upon thermal brazing to be approximately equal to each other through utilization of the abovementioned hysteretic property.

The joined body according to the first aspect of the invention is characterized in that a brazing filler material having a solidus point of not higher than 700° C. is used, and a metallic member comprises a metallic material of which the pearlite transformation is brought about at a temperature not higher than the solidus point of the brazing filler material or is inhibited. The metallic structure upon joining is at least one of a supercooled structure and a martensite structure. The expression "supercooled structure" excludes the pearlite structure in a narrow sense, and includes sorbite, troostite and bainite structures.

The brazing filler material to be used has a solidus point of not higher than 700° C. The term "solidus point" used herein means the temperature at which a liquid brazing filler material is completely solidified. The reason for the setting of the solidus point to be not higher than 700° C. will be explained below, referring to FIG. 1.

In general, a brazing filler material begins to practically have strength at a temperature of about [solidus point −100° C.]. For instance, when BAg 8 (solidus point 779° C.) shown in Comparative Example 3 is used as the brazing filler material, the material is considered to start showing strength at about 680° C. In the case of joining $Si_3N_4$, however, a normal joined body is not obtainable, and the joint strength obtained is extremely low. Namely, if the temperature at which the brazing filler material starts solidification after the brazing of ceramic and metal to each other is high, even a considerably great hysteresis loop may fail to cover up the difference in contraction between the ceramic and metal. Thus, a lower solidus point is more favorable.

Experimental results show that where, for instance, a brazing filler material having a solidus point of not higher than 700° C. is used for $Si_3N_4$, joining free of lowering in strength is attainable even for a large maximum length (diameter) of joint area (for example, at least 20 mm, particularly at least 50 mm) when a metal showing a large hysteresis loop is used as the mating material and cooling conditions are appropriately selected. A brazing filler material having a solidus point of higher than 700° C. yields an insufficient joint strength; though a certain degree of joining is achievable for a small maximum length of about 5 mm, satisfactory joining is not attainable for maximum lengths of more than about 5 mm, with such a brazing filler material.

Thus, when the solidus point of the brazing filler material is not higher than 700° C., it is possible to obtain a sufficiently high joint strength, even for a large joint diameter. This solidus point is generally not lower than 500° C. Because it may be to obtain a sufficiently high joint strength, when the solidus point is lower than 500° C.

The metallic material in this invention may be any metallic material capable of a reduction in the difference in contraction coefficient between the metallic material and a ceramic by lowering the contraction coefficient of the metallic material at a temperature not higher than the temperature at which the brazing filler material starts to show strength. It is desirable that the $Ar_1$ point of the metallic material be not higher than [(solidus point of brazing filler material) −100° C.]. The intended result is satisfactorily attainable when the above-mentioned effect on the contraction coefficient is provided at a temperature not higher than the temperature at which the brazing filler material starts to have strength (practically, the temperature at which adhesion is started).

It is practical to use, as the metallic material, a metallic material showing a great hysteresis even with a relatively low cooling rate, around the cooling rate of air cooling. The relationship between cooling rate and hysteresis is heavily affected by alloying elements such as Ni, Cr, Mo and Mn. According to the invention, it is possible to produce a joined body with an extremely large joint diameter. In the case of such a large-diameter joined body, a considerable difference in cooling rate may be generated between an outer peripheral portion and an inner peripheral portion. The contents of the alloying elements are important for obtaining a stable hysteresis, even in the presence of such a large cooling rate difference.

Nickel (Ni) has excellent properties for lowering the transformation point, reducing the mass effect preventing toughness from being lowered due to unsatisfactory quenching etc. The content of Ni is preferably 1 to 5% by weight, and a content of about 3% by weight is particularly suitable in consideration of productivity and cost.

The elements Cr, Mo and Mn each have a high effect of lowering the critical cooling rate. The Cr content is preferably not more than 8% by weigh, from the viewpoint of balance of cost and the effect. Both Mo and Mn have a conspicuous effect on the reduction in the critical cooling rate, even when the amount thereof is small. An addition of Mn in an amount of, for example, 0.7% by weight ensures a stable hysteresis, from an outer to a central region of the joined portion, even when the joint diameter is enlarged by a factor of about 3.9. Thus, in stable application to this invention, the Mn content is preferably 0.3 to 1.5% by weight. Similarly, an addition of Mo in an amount of about 0.2% by weight allows for an increase in the joint diameter by a factor of about 1.6, and the Mo content is preferably not more than 1.5% by weight, similarly to Mn. For control of hardness after brazing, the content of C is preferably not more than about 2% by weight. Other than the above-mentioned, Si, W, V, P or the like may be added in an amount of not more than about 1% by weight, for control of stability of performance. Moreover, S may be added in an amount of not more than 0.1% by weight, for improvement of machining property.

Figure 2:
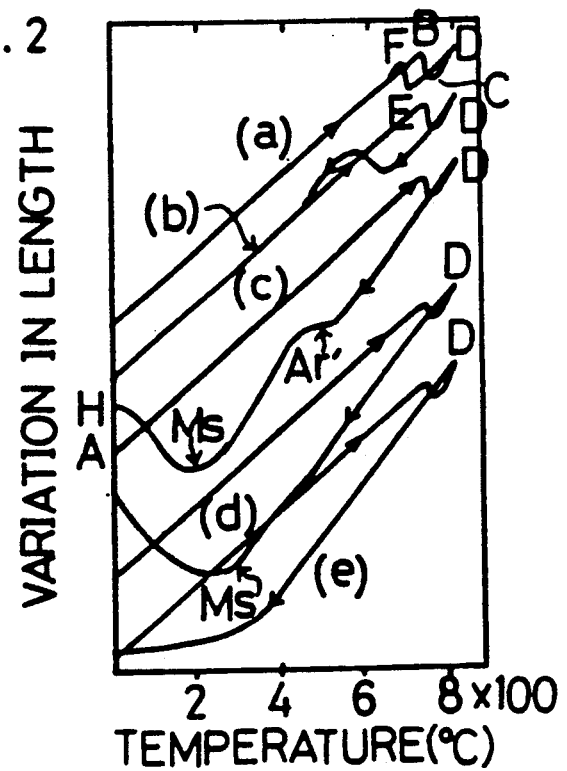
FIG. 2 shows graphs of variations in length with temperature, for various cooling rates.
Figure 3:
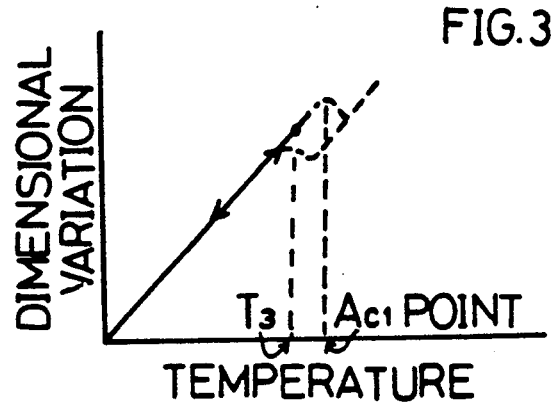
Figure 4:
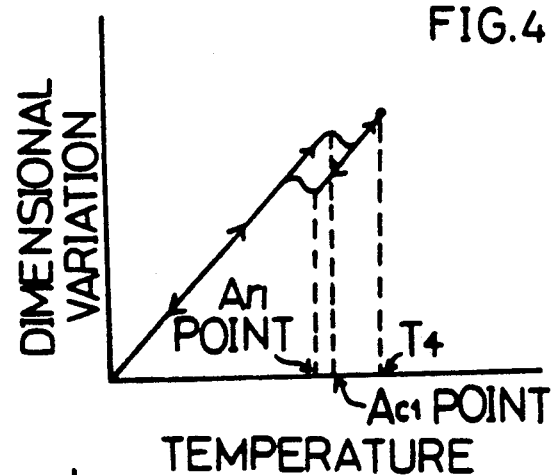
Figure 5:
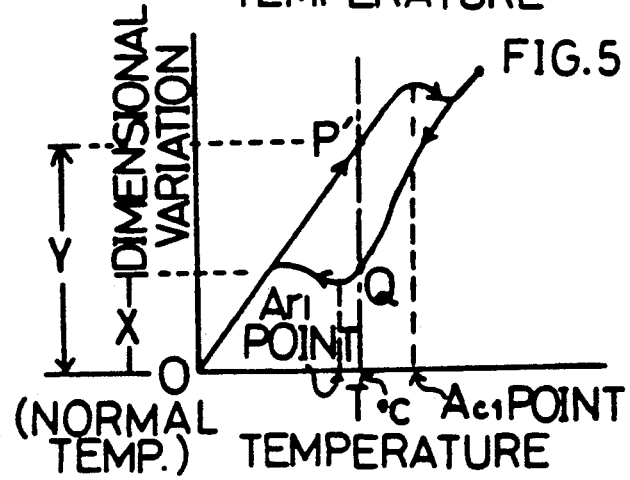

Besides, as shown with an example of eutectoid steel in FIG. 2, the hysteresis curve varies depending on the cooling rate. Therefore the cooling condition should be selected so as to reduce strain upon joining, in consideration of the brazing filler material (solidus point) used, the expansion coefficient of the ceramic, etc.

The metallic material may be a metallic material which, as indicated by curve (b) in FIG. 2, has a higher degree of supercooling and a further lower $Ar_1$ point (desirably with a further greater hysteresis), as compared with of curve (a), and which has a sorbite structure instead of a pearlite structure after joining (normal temperature). The metallic material may also be a metallic material which, as indicated by curve (c), does not have a clear $Ar_1$ point but has an $Ar'$ point and which has a troostite structure. The metallic material may further be a metallic material which is cooled at a further increased cooling rate as indicated by curve (d) or is perfectly inhibited from pearlite transformation as shown in FIG. 1, and is brought into martensitic transformation at a further lower temperature (Ms point) to have a mixed structure of bainite and martensite. Moreover the metallic material may be a metallic material not brought into martensitic transformation, as indicated by curve (e) in FIG. 2. The metallic material not undergone the martensitic transformation is obtainable generally by a method wherein the material is rapidly cooled to a temperature slightly above the martensitic transformation point and is maintained at that temperature. The metallic material having the mixed structure of bainite and martensite, generally, has a volume greater than the original volume thereof due to a volume expansion, as indicated by curve (d).

In these cases, the cooling is achievable by an especial gaseous medium cooling method (for instance, by introduction of an appropriate quantity of coolant) which has a cooling rate around the cooling rate of oil cooling or water cooling. The cooling is also achievable by oil cooling or water cooling, with some measure to prevent the ceramic from being cracked upon oil cooling and water cooling. Thus, the cooling means is not particularly limited in the first aspect of this invention.

The ceramic material in the invention may be $Si_3N_4$, sialon, SiC, A l N or a low-expansion low-temperature-fired ceramic (having a coefficient of thermal expansion or contraction of about $2 \times 10^{-6}$ to $5 \times 10^{-6}/°C$.), or may be a ceramic having a relatively high coefficient of expansion (7 to $8 \times 10^{-6}$), such as $Al_2O_3$, or the like. Hitherto the ceramic having a relatively high coefficient of expansion has been considered to be difficult to apply to a large joint diameter (for instance, 10 mm $\phi$), because an increase in joint diameter leads to concentration of cumulative strain on an outer peripheral portion even if the different in contraction between the ceramic and the mating metal is small. According to the invention, on the other hand, the ceramic having a relatively high expansion coefficient are favorably applicable to large joint diameters.

Another matter of importance is the coefficient of contraction of the metal, from temperature of about 500° C. at which the low-melting brazing filler material begins to have strength. A variety of test results show that where the above-mentioned ceramic is used, it is possible to obtain a favorable joined body with extremely little residual stress by using metallic material which has a contraction coefficient of $2 \times 10^{-6}$ to $6 \times 10^{-6}/°C.$ (as determined over the temperature range from 500° C. to normal temperature). The coefficient of contraction, used herein, is the value calculated from the difference between a size at 500° C. and the corresponding size at normal temperature in the cooling process, regardless of the displacements at the intermediate stages of the process. Thus, the coefficient of contraction is independent also of the size before heating.

The means for joining for the ceramic member and the metallic member may be a generally known method, such as an activated metal method, a physical vapor deposition method, and a high-melting metal method, provided that the method employs brazing by a brazing filler material having a solidus point of not higher than 700° C.

The joining process according to the second aspect of this invention is characterized in that the materials mentioned in the first aspect of the invention are used and are heated to a temperature of not lower than the austenitic transformation point ($Ac_1$ point) of the metallic material, and are then subjected to gaseous medium cooling at a predetermined cooling rate. The term "gaseous medium cooling" used herein means cooling by use of a gas such as air, an inert gas, etc. as a medium, or cooling under a predetermined vacuum. The cooling method employed in the joining process of the second aspect of the invention is limited to the gaseous medium cooling method, and does not include oil cooling or air cooling. This limitation is provided for securely preventing the cracking of the ceramic, and for ensuring a simple and easy process. Thus the metallic material applicable to the joining process of the second aspect of the invention excludes the materials with which the intended result is obtainable by a method other than the gaseous medium cooling, though the magnitude of the cooling rate is not particularly limited. If the cooling rate is less than 0.1° C./sec, it may be difficult to maintain a satisfactory supercooled condition, and such a cooling rate is impractical. On the other hand, a cooling rate of more than 200° C./sec is too rapid to obtain a stable cooled condition, and is not practical. The expression "at least in the vicinity of the $A_1$ point" is used herein because the cooling rate in the vicinity of the $A_1$ point has a great effect on the hysteresis curve. Thus, the cooling rate in other regions than the vicinity of the $A_1$ point is not particularly limited. In the case of air cooling, for instance, the "vicinity" of the $A_1$ point generally means the range of the $A_1$ point plus or minus about 100° C. (more generally, plus or minus about 50° C.).

EXAMPLES

This invention will now be explained in detail below while referring to Examples.

EXAMPLE 1

The relationship between temperature and elongation (contraction) of a metallic member and a ceramic member used in this examples are shown in FIG. 1. As the ceramic member, a disk formed of $Si_3N_4$ ($\alpha = 3 \times 10^{-6}/°C.$) and having a diameter of 30 mm and a thickness of 5 mm (denoted by 2 in FIGS. 6 and 7) was used. As the metallic member, a shaft formed of JIS "SNCM 630" and having a diameter of 30 mm and a length of 50 mm (denoted by 3 in FIGS. 6 and 7) was used. An In-Cu-Ag-Ti alloy was used as the brazing filler material. The ceramic mic member, metallic member and brazing filler material disposed in position were maintained in a vacuum at 790° C. for 15 minutes, cooled (by furnace cooling) to 300° C. over 10 minutes, and then appropriately cooled substantially to room temperature, to obtain a joined body.

The composition of "SNCM 630" comprised 0.25 to 0.35% by weight of C ("by weight" will be hereinafter referred as "%"), 0.15 to 0.35% of Si, 0.35 to 0.60% of Mn, 2.5 to 3.5% of Ni, 2.5 to 3.5% of Cr, 0.5 to 0.7% of Mo, not more than 0.03% of S, not more than 0.3% of Cu, and not more than 0.03% of P. The brazing filler material had a solidus point of 625° C., and the composition thereof comprised 27% of Cu, 9.5% of In, 1.25% of Ti, and the balance of Ag. The "SNCM 630" is an extremely useful material which is inhibited from pearlite transformation by being supercooled even with a relatively low cooling rate around the cooling rate of air cooling, therefore shows a great hysteresis, is easily brought into martensitic transformation even by air cooling, and shows a large hysteresis even under furnace cooling.

The term "air cooling" used herein means a cooling at a cooling rate of not more than about 10° C./sec, which may be achieved by opening a furnace window to permit a natural flow of the air at room temperature into the furnace, or by introducing an inert gas such as nitrogen and argon through a furnace window into the furnace and operating a fan for forced cooling. The term "furnace cooling" means a cooling in a furnace, without any artificial change in the furnace, and with a cooling rate lower than the cooling rate of the air cooling. The cooling rate of not higher than 10° C./sec is attained by air cooling or furnace cooling. Therefore the operation is easy and a satisfactory supercooled condition is maintained.

The brazing filler material used has a solidus point of 625° C., but the temperature at which the material begins to practically show strength is around 500° C. (point P), which is lower than the solidus point by about 100° C. Assuming that the joining of the ceramic member and the metallic member proceeds from the point P in FIG. 1, then the ceramic member undergoes a contraction of P→X, while the metallic member undergoes a contraction of P→Y. As result, a difference in contraction of X-Y is left between the ceramic member and the metallic member. Such a level of contraction difference does not matter at all, in practical use.

Figure 6:
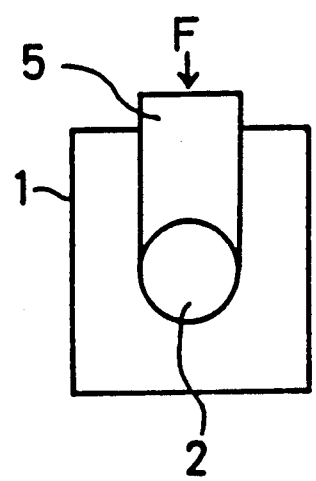
Figure 7:
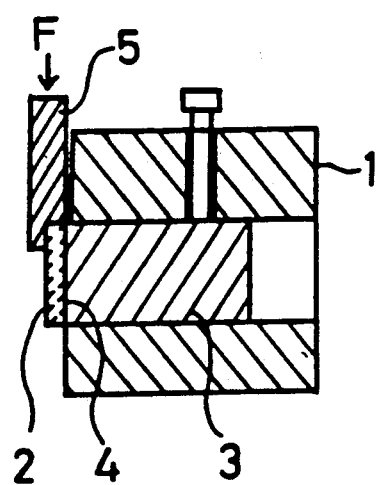

This is evident from the fact that the joined body returned to room temperature was free of abnormal conditions such as cracks and that the joined body showed a favorable shearing strength of 15 kg/mm$^2$, as measured by use of predetermined jigs, shown in FIGS. 6 and 7, and a predetermined autograph with a loading rate of 0.5 mm/min. The shearing strength value was higher than the shearing strength (13 kg/mm$^2$) of a test piece (Comparative Example 1) obtained through brazing by use of a Cu shock-absorbing plate 0.5 mm thick as well as the same brazing filler material as above. The metallic structure in the joined body was comprised mainly martensite.

EXAMPLES 2 TO 5

Examples 2 to 5 and Comparative Examples 2 and 3 were performed by carrying out the joining of a ceramic member and metallic member, without use of any shock-absorbing plate, while employing the ceramic material, metallic material, brazing filler material, solidus thereof, brazing temperature and cooling conditions as setforth in the Table. The metallic materials used in Examples 2 to 4 each have a characteristic curve substantially equivalent to the characteristic curve of Example 1 shown FIG. 1. In Example 5, the cooling conditions were so selected as to inhibit the martensitic transformation.

As the ceramic member, a disk of 35 mm diameter and 4 mm thickness was used. On the adhered surface of the ceramic member, a metal such as Ti was deposited by physical vapor deposition such as sputterin.

TABLE

| | Ceramic material | Metallic material JIS | Composition of brazing filler material | Solidus point of brazing filler material | Brazing conditions | Cooling conditions | Shearing strength kg/mm$^2$ |
|---|---|---|---|---|---|---|---|
| Example 2 | $Si_3N_4$ A | SNCM 616 | Incusil-15 | 630 (°C.) | 795° C. 15 min | vacuum furnace cooling | 14 |
| Example 3 | " | SNCM 439 | BAg 5 | 677 | 790° C. 15 min | vacuum furnace cooling | 16 |
| Example 4 | $Si_3N_4$ B | SNCM 815 | BAg 7 | 618 | 780° C. 15 min | vacuum furnace cooling | 14 |
| Example 5 | " | SNCM 630 | BAlSi-2 | 577 | 760° C. 15 min | vacuum furnace cooling to 450° C., keeping at 450° C. for 20 min, and furnace cooling | 15 |
| Comparative Example 2 | $Si_3N_4$ A | S45C | " | 577 | 795° C. 15 min | vacuum furnace cooling | ceramic cracked |
| Comparative Example 3 | " | SNCM 616 | BAg 8 | 779 | 850° C. 15 min | vacuum furnace cooling | 8 |

As the metallic member, a shaft of 35 mm diameter and 50 mm thickness was used. For silicon nitride A, a total of 10% by weight (hereinafter referred to as "%") of alumina and yttria was uses as a sintering assistant. For silicon nitride B, a total of 10% of aluminium nitride, alumina and yttria was used as a sintering assistant. The alloy compositions (%) of the metallic material (exclusive of the above-mentioned metallic material) and the brazing filler materials used are set forth below.

"SNCM 616" contains 0.16% of C, 1.0% of Mn, 3.0% of Ni, 1.6% of Cr, and 0.5% of Mo;

"SNCM 439" contains 0.39% of C, 0.75% of Mn, 1.8% of Ni, 0.8% of Cr, and 0.23% of Mo;

"SNCM 815" contains 0.15% of C, 0.45% of Mn, 4.25% of Ni, 0.85% of Cr, and 0.23% of Mo;

"S45C" contains 0.45% of C;

"Incusil-15" (a product by GTE PRODUCTS CORPORATION) as the brazing filler material contains 61.5% of Ag, 24% of Cu, and 14.5% of In;

"BAg 5" according to the AWS (American Welding Society) Classification contains 45% of Ag, 30% of Cu, and 25% of Zn;

"BAg 7" contains 56% of Ag, 22% of Cu, and 17% of Zn; and

"BAlSi-2" contains 7.5% of Si, 0.25% of Cu, 0.8% of Fe, 0.2% of Zn, and 0.1% of Mn, the balance being Al. Moreover the metallic material may be "SNCM 447" which contains 0.44 to 0.50% of C, 0.6 to 0.9% of Mn, 1.6 to 2.0 of Ni, 0.6 to 1.0 of Cr, and 0.15 to 0.3 of Mo.

The metallic structure in the joined body obtained in each of Examples 2 to 4 comprised martensite and bainite, whereas the metallic structure in the joined body obtained in Examples 5 consisted essentially of bainite due to the substantial inhibition of the martensitic transformation.

The shearing strength of the joined bodies obtained as above was determined by the same method as in Example 1, the results being shown in Table. As seen from the results, in each of Examples 2 to 5 the shearing strength was as high as 14 to 16 kg/mm$^2$, and extremely favorable joining was achieved for the large joint diameter of 35 mm.

In Comparative Example 2, on the other hand, cracking occurred in the ceramic. The reason is as follows. Since the metallic material "S45C" used does not show a great hysteresis through supercooling, as contrasted to the above-mentioned materials, a large difference in contraction results between the metallic member and the ceramic member. In addition, the large joint diameter of 35 mm was employed. Therefore, a heavy strain was generated upon joining, resulting in cracking of the ceramic. Comparative Example 3, in which the brazing filler materials had a high solidus point of more than 700° C., gave a low shearing strength.

Thus, in each Example 1 to 5, with the metallic material showing a great hysteresis even under the furnace cooling at a cooling rate lower than the cooling rate of air cooling, and with the brazing filler material showing a solidus point in the appropriate range of 577° to 630° C., a much better joined condition free from cracking of ceramic was obtained with a higher joint strength, as compared with those obtained in Comparative Examples, notwithstanding the large joint diameter of 30 to 35 mm. Besides, in each of Examples of the invention, the solidus point of the brazing filler material used was not lower than 500° C., which ensures the excellent joint strength and, particularly, ensures a high suitability to the above-mentioned uses of this invention.

What is claimed is:

1. A process for joining a ceramic body and a metallic body, comprising the steps of:

disposing a brazing filler material having a solidus point of not higher than 700° C. between desired joint surfaces of the ceramic body and the metallic body, wherein the metallic body comprises metallic material selected from a group of materials consisting of (1) material in which the pearlite transformation, including the ordinary pearlite transformation ($Ar_1$) and the supercooled pearlite transformation ($Ar'$) caused by a temperature lower than the ordinary pearlite transformation ($Ar_1$) point after supercooling of austenite, occurs at a temperature not higher than the solidus point of the brazing filler material, and (2) a material in which the pearlite transformation is completely inhibited;

heating the resultant assembly to a temperature not lower than the solidus point of the brazing filler material and not lower than the austenitic transformation point of the metallic material to cause the austenitic transformation of the metallic material; and cooling the assembly by gaseous medium cooling at a cooling rate of 0.1°-200° C. per second, at least to the $A_1$ (inclusive of $Ar_1$ and $Ar'$) point of the metallic material ±100° C., to cause pearlite transformation at a temperature not higher than the solidus point of the brazing filler material or to completely inhibit the pearlite transformation, thereby reducing the difference in displacement due to expansion or contraction between the ceramic member and the metallic member.

2. The process for joining a ceramic body and a metallic body as claimed in claim 1, wherein the metallic member contains, by weight, 1-5% of Ni, not more than 8% of Cr, 0.3-1.5% of Mn, not more than 1.5% of Mo, and not more than 2% of C, the remainder being essentially iron.

3. The process for joining a ceramic body and a metallic body as claimed in claim 1, wherein said metallic member consists essentially of Nickel Chromium Molybdenum steels which are selected from the group of:

a material comprising 0.13 to 0.20% of C, 0.15 to 0.35% of Si, 0.80 to 1.20% of Mn, 2.80 to 3.20% of Ni, 1.40 to 1.80% of Cr, and 0.40 to 0.60% of Mo;

a material comprising 0.36 to 0.43% of C, 0.15 to 0.35% of Si, 0.60 to 0.90% of Mn, 1.60 to 2.00% of Ni, 0.60 to 1.00% of Cr, and 0.15 to 0.30% of Mo;

a material comprising 0.12 to 0.18% of C, 0.15 to 0.35% of Si, 0.30 to 0.60% of Mn, 4.00 to 4.50% of Ni, 0.70 to 1.00% of Cr, and 0.15 to 0.30% of Mo, and a material comprising 0.25 to 0.35% of C, 0.15 to 0.35% of Si, 0.35 to 0.60% of Mn, 2.5 to 3.5% of Ni, 2.5 to 3.5% of Cr, and 0.5 to 0.70% of Mo; and wherein the solidus point of the brazing filler material is 577°-677° C.

4. The process for joining a ceramic body and a metallic body as defined in any of claims 1-3, wherein said step of gaseous medium cooling is selected from the types of cooling consisting of air cooling and furnace cooling, and wherein said step of cooling further occurs at 0.1° to 10.0° C. per second at least in the range of ±100° C. of the $A_1$ point of the metallic material.

* * * * *